(12) United States Patent
Miyahara et al.

(10) Patent No.: US 11,559,771 B2
(45) Date of Patent: Jan. 24, 2023

(54) METHOD FOR MANUFACTURING ZEOLITE MEMBRANE STRUCTURE

(71) Applicant: NGK INSULATORS, LTD., Nagoya (JP)

(72) Inventors: Makoto Miyahara, Tajimi (JP); Shinji Nakamura, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 697 days.

(21) Appl. No.: 16/572,911

(22) Filed: Sep. 17, 2019

(65) Prior Publication Data

US 2020/0009510 A1 Jan. 9, 2020

Related U.S. Application Data

(63) Continuation of application No. PCT/JP2018/008119, filed on Mar. 2, 2018.

(30) Foreign Application Priority Data

Mar. 30, 2017 (JP) .............................. JP2017-068712

(51) Int. Cl.
*B01D 67/00* (2006.01)
*B01D 69/04* (2006.01)
(Continued)

(52) U.S. Cl.
CPC ..... *B01D 67/0051* (2013.01); *B01D 67/0079* (2013.01); *B01D 69/046* (2013.01);
(Continued)

(58) Field of Classification Search
CPC ............ B01D 71/028; B01D 67/0051; B01D 69/105; B01D 71/52; B01D 69/10;
(Continued)

(56) References Cited

U.S. PATENT DOCUMENTS 5,538,711 A 7/1996 Emerson et al.
2005/0148457 A1* 7/2005 Yabuki .................... C01B 39/04
502/64

(Continued)

FOREIGN PATENT DOCUMENTS

JP H06-228481 A1 8/1994
JP H08-509453 A1 10/1996
(Continued)

OTHER PUBLICATIONS

International Search Report and Written Opinion (Application No. PCT/JP2018/008119) dated May 22, 2018.
(Continued)

*Primary Examiner* — Vishal V Vasisth
(74) *Attorney, Agent, or Firm* — Burr & Brown, PLLC (57) ABSTRACT

A method for manufacturing a zeolite membrane structure comprises an immersion step for immersing a porous substrate in a synthetic sol, and a synthesis step for hydrothermally synthesizing a zeolite membrane on a surface of the porous substrate that has been immersed in the synthesis so. When the foamability of the synthetic sol is measured by a Ross-Miles method under a condition of 25 degrees C., the foam height after elapse of 5 minutes from completion of down flow is less than or equal to 5 mm.

4 Claims, 3 Drawing Sheets

(51) Int. Cl.
  *B01D 69/10* (2006.01)
  *B01D 71/02* (2006.01)
  *B01D 71/52* (2006.01)
  *B01D 71/70* (2006.01)
(52) U.S. Cl.
  CPC ........... *B01D 69/10* (2013.01); *B01D 71/028* (2013.01); *B01D 71/52* (2013.01); *B01D 71/70* (2013.01); B01D 2323/28 (2013.01); B01D 2325/021 (2013.01)

(58) Field of Classification Search
  CPC .. B01D 71/70; B01D 53/228; B01D 67/0079; B01D 19/04; B01D 69/046; B01D 69/12; B01D 2323/28; B01D 2325/021; B01D 2257/504; B01D 2256/245; C01B 39/02; C01B 39/48
  See application file for complete search history.

(56) References Cited

U.S. PATENT DOCUMENTS

| | | |
|---|---|---|
| 2006/0189476 A1 | 8/2006 | Deckman et al. |
| 2006/0252631 A1 | 11/2006 | Deckman et al. |
| 2007/0209425 A1* | 9/2007 | Shibata ................. B01D 65/10 73/40 |
| 2009/0120875 A1 | 5/2009 | Liu et al. |
| 2010/0144512 A1 | 6/2010 | Uchikawa et al. |

FOREIGN PATENT DOCUMENTS

| | | |
|---|---|---|
| JP | 2003-210953 A1 | 7/2003 |
| JP | 2004-344755 A1 | 12/2004 |
| JP | 2010-158665 A1 | 7/2010 |
| JP | 2015-096247 A1 | 5/2015 |

OTHER PUBLICATIONS

English Translation of International Preliminary Report on Patentability (Chapter I) (Application No. PCT/JP2018/008119) dated Oct. 10, 2019, 9 pages.

* cited by examiner

METHOD FOR MANUFACTURING ZEOLITE MEMBRANE STRUCTURE

This application is a CON of PCT/JP2018/008119 filed Mar. 2, 2018.

TECHNICAL FIELD

The present invention relates to a method for manufacturing a zeolite membrane structure.

BACKGROUND ART

Typically a method for manufacturing a zeolite membrane structure is known in which hydrothermal synthesis of a zeolite membrane is performed in a configuration in which a porous substrate is immersed in a synthetic sol (reference is made for example to Japanese Patent Application Laid-Open No. 2010-158665).

SUMMARY

However a pinhole may be produced in a hydrothermal zeolite membrane.

Typically, it is thought that a pinhole is produced as a result of detachment of seed crystals in a configuration when seed crystals are coated onto a support, or as a result of defects that are produced inside the crystal boundary when the crystals are growing.

Furthermore, when the porous substrate has a monolithic configuration, a cause that had not previously been identified is that it may be the case that insufficient zeolite seed crystal growth results in membrane formation defects in some cells of the plurality of cells.

In this context, as a result of diligent investigations by the present inventors, the new insight has been gained that a result for membrane formation defects resulting from pinholes or insufficient seed crystal growth is the attachment of microscopic bubbles to the porous substrate that has been immersed in the synthetic sol.

The present invention is proposed in light of the situation described above, and has the object of providing a method for manufacturing a zeolite membrane structure that inhibits membrane formation defects in a zeolite membrane.

The method for manufacturing a zeolite membrane structure according to the present invention includes an immersion step for immersing a porous substrate in a synthetic sol, and a synthesis step for hydrothermally synthesizing a zeolite membrane on a surface of the porous substrate that has been immersed in the synthesis sol. When a foamability of the synthetic sol is measured by a Ross-Miles method under a condition of 25 degrees C., a foam height after elapse of 5 minutes from completion of down flow is less than or equal to 5 mm.

The present invention enables provision of a method for manufacturing a zeolite membrane structure that inhibits membrane formation defects in the zeolite membrane.

DESCRIPTION OF EMBODIMENTS

Configuration of Separation Membrane Structure 10

Figure 1:
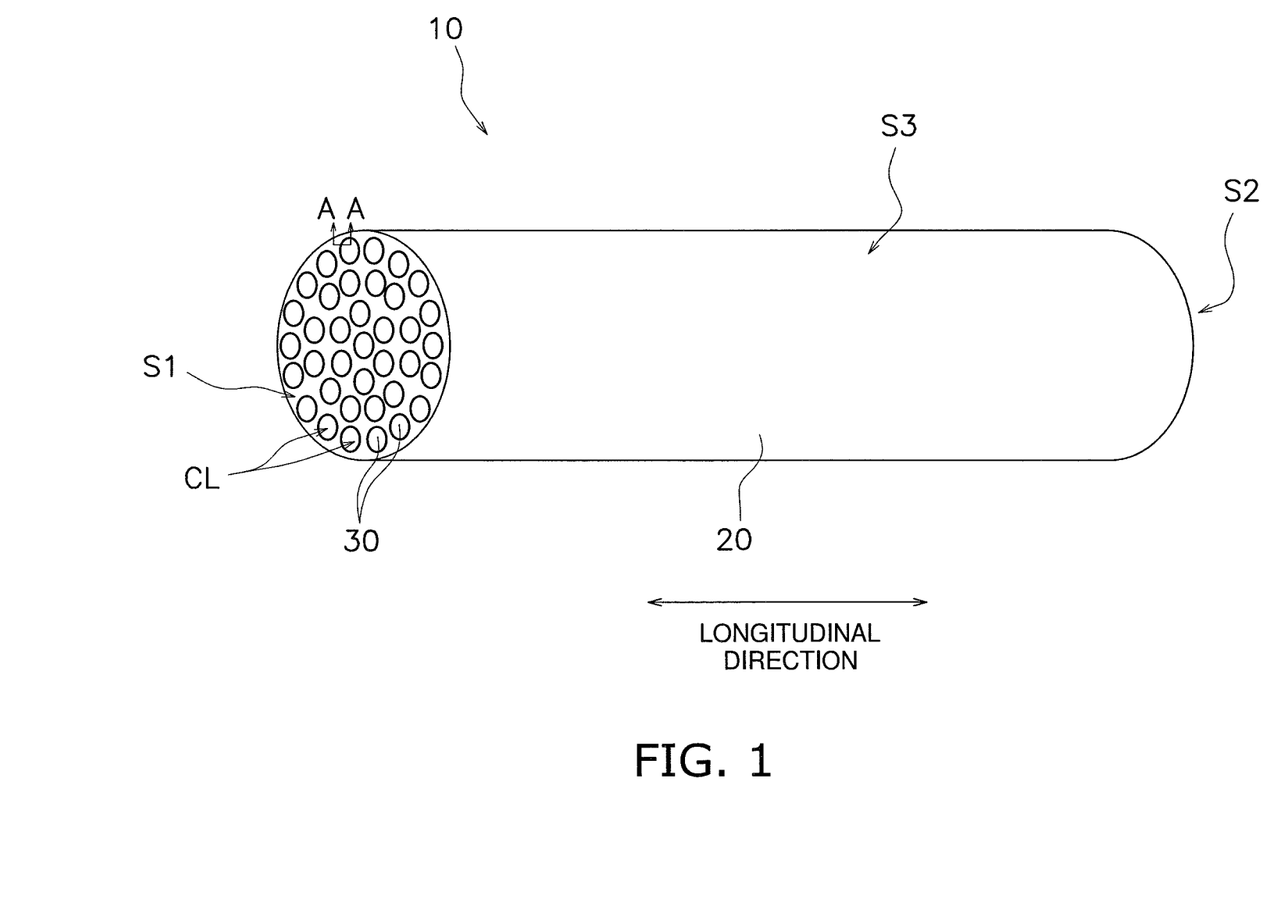
FIG. 1 is a perspective view of a zeolite membrane structure.
Figure 2:
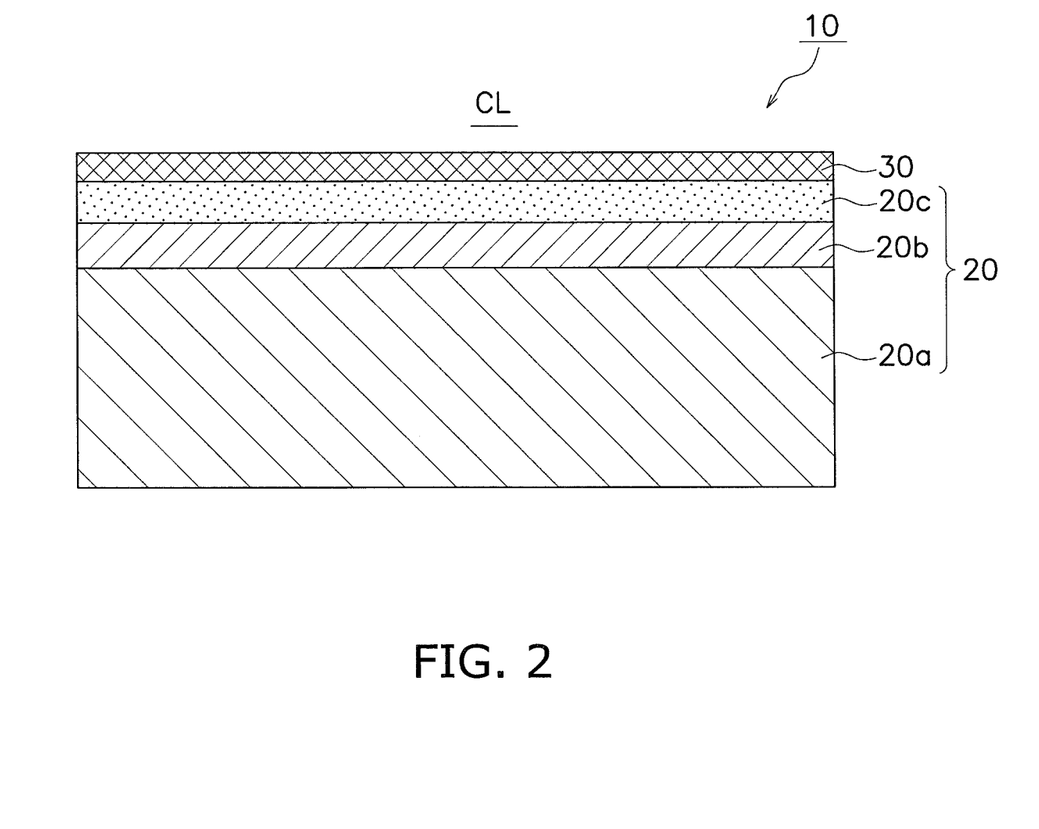
FIG. 2 is a sectional view along A-A in FIG. 1.

FIG. 1 is a perspective view of a separation membrane structure 10. FIG. 2 is a sectional view along A-A in FIG. 1. The separation membrane structure 10 includes a porous substrate 20 and a zeolite membrane 30.

1. Porous Substrate 20

The porous substrate 20 is formed in a monolithic shape that has a plurality of filtration cells CL that allows flow of a mixed fluid (mixed liquid or mixed gas) that is the object of a filtration process. A "monolithic shape" is a shape that includes through holes that are formed in a longitudinal direction, and includes a concept such as a honeycomb. However the outer shape of the porous substrate 20 is not limited to a monolithic shape.

There is no particular limitation on the length of the porous substrate 20, and for example, it may be configured as 150 mm to 2000 mm. There is no particular limitation on the diameter of the porous substrate 20, and for example, it may be configured as 30 mm to 220 mm The porous substrate 20 has a first end surface S1, a second end surface S2, and a side surface S3. The first end surface S1 is provided opposite to the second end surface S2. The side surface S3 is connected to the first end surface S1 and the second end surface S2. Each filtration cell CL passes through the porous substrate 20 from the first end surface S1 to the second end surface S2. Each filtration cell CL extends in a longitudinal direction of the porous substrate 20. In the present embodiment, the cross sectional shape of each filtration cell CL is circular, however there is no limitation to a circula shape, and it may be a polygonal shape of greater than or equal to a triangular shape.

In the present embodiment, the porous substrate 20 as shown in FIG. 2 includes a substrate 20a, an intermediate layer 20b and a surface layer 20c.

The porous substrate includes a plurality of pores in an inner portion. A 5% cumulative pore distribution diameter (D5) in relation to a volume reference of the porous substrate 20 may be configured as greater than or equal to 0.1 μm. The 5% cumulative pore diameter (D5) is a pore diameter that corresponds to a 5% total from a small diameter in relation to a volume-converted pore diameter distribution of the porous substrate 20.

a. Substrate 20a

The substrate 20a is configured from a porous material. The porous material includes use for example of a sintered ceramic, a metal, an organic polymer, glass, or carbon, or the like. The sintered ceramic includes alumina, silica, mullite, zirconia, titania, yttria, silicon nitride, silicon carbide, or the like. The metal includes aluminum, iron, bronze, silver, stainless steel, or the like. The organic polymer includes polyethylene, polypropylene, polytetrafluoroethylene, polysulfone, polyimide, or the like.

The substrate 20a may include an inorganic binder. The inorganic binder may include use of at least one of titania, mullite, sinterable alumina, silica, glass frits, clay minerals, and sinterable cordierite.

Although there is no particular limitation in this regard, the average pore diameter of the substrate 20a may be configured for example as 5 μm to 25 μm. The average pore diameter of the substrate 20a may be measured by use of a mercury porosimeter. The porosity of the substrate 20a may be configured for example as 25% to 50%.

There is no particular limitation on the average particle diameter of the porous material that configures the substrate 20a and for example, it may be configured as 5 μm to 100

μm. In the present embodiment, the "average particle diameter" is the value of the arithmetic mean for the maximum diameter of 30 measured particles that are measured by cross sectional micro-structure observation by use of a scanning electron microscope (SEM).

b. Intermediate Layer 20b

The intermediate layer 20b is formed on the substrate 20a. The intermediate layer 20b can be configured by the porous material as that used in the substrate 20a. The average pore diameter of the intermediate layer 20b may be smaller than the average pore diameter of the substrate 20a, and for example may be configured as 0.005 μm to 5 μm. The average pore diameter of the intermediate layer 20b may be measured by use of a perm-porometer. The porosity of the intermediate layer 20b may be configured for example as 20% to 60%. The thickness of the intermediate layer 20b may be configured for example as 30 μm to 300 μm.

c. Surface Layer 20c

The surface layer 20c is formed on the intermediate layer 20b. The surface layer 20c can be configured by the porous material that can be used in the substrate 20a. The average pore diameter of the surface layer 20c may be smaller than the average pore diameter of the intermediate layer 20b, and for example may be 0.001 μm to 2.0 μm. The average pore diameter of the surface layer 20c may be measured by use of a perm-porometer. The porosity of the surface layer 20c may be configured for example to 20% to 60%. The average thickness of the surface layer 20c for example may be configured as 1 μm to 50 μm.

(2) Zeolite Membrane 30

The zeolite membrane 30 is formed on the inner surface of each filtration cell CL that is formed in the porous substrate 20. In the present embodiment, the zeolite membrane 30 is formed in a cylindrical shape.

There is no particular limitation in relation to the crystalline structure of the zeolite that configures the zeolite membrane 30, and it may for example be LTA, MFI, MOR, FER, FAU, DDR, CHA, BEA, AEI, AFX, ERI, SAT, ETL, LEV, AFV, or the like. When the zeolite membrane 12 is a DDR-type zeolite membrane, it is particularly suitable as a gas separation membrane for selective separation of carbon dioxide.

There is no particular limitation on the thickness of the zeolite membrane 30 and when the permeation amount of a permeation component that passes through the zeolite membrane 30 from a mixed fluid is taken into account, it is preferably less than or equal to 10 μm and more preferably less than or equal to 5 μm.

There is no particular limitation on the average pore diameter of the zeolite membrane 30 which may be suitably determined based on the required filtration and separation performance and for example, may be configured as 0.0003 μm to 1.0 μm.

It is noted that the average pore diameter of the zeolite membrane 30 is taken to be the arithmetic average of the major diameter and the minor diameter of an oxygen n-membered ring pore having a backbone forming the pores that is constituted by a ring of less than or equal to the oxygen n-membered ring. The oxygen n-membered ring has a number n of oxygen atoms that configure the backbone forming the pore, includes at least one of an Si atom, Al atom or P atom, and is a moiety that forms a ring structure in which the respective oxygen atoms are bound with a Si atom, an Al atom, a P atom, or the like. When the zeolite has a plurality of oxygen n-membered ring pores in which n takes the same value, the average pore diameter of the zeolite is taken to be the arithmetic average of the major diameter and the minor diameter of all the oxygen n-membered ring pores. In this manner, the average pore diameter of a zeolite membrane is uniquely determined with reference to the backbone structure and can be calculated with reference to the values disclosed in The International Zeolite Association (IZA) "Database of Zeolite Structures" [online], Internet <URL: http://www.iza-structure.org/databases/>.

In this regard, in the present embodiment as stated below, the foam height of the synthetic sol used in hydrothermal synthesis of the zeolite membrane 30 is suppressed to a value of less than or equal to 5 mm. In this manner, since it is possible to inhibit attachment of bubbles to the zeolite seed crystals that have become attached to the surface of the porous substrate 20, it is possible to inhibit membrane formation defects in the zeolite membrane 30 as a result of insufficient growth in seed crystals or pinholes.

More specifically, when the membrane thickness of the zeolite membrane 30 is less than or equal to 10 μm, the total surface area of pinholes having an equivalent circle diameter of greater than or equal to 1 μm is less than or equal to 0.02 $m^2$ per 1 $m^2$. When the surface of the zeolite membrane 30 is observed in a plan view, the equivalent circle diameter of the pinholes is the diameter of a circle that has the same surface area as the pinholes. The total surface area of the pinholes may be calculated by detecting pinholes having an equivalent circle diameter greater than or equal to 1 μm by observing the surface of the zeolite membrane 30 with an SEM (magnification 10000 times, field of view 0.01 $mm^2$), and then converting the total surface area of the detected pinholes to a total area per 1 $m^2$.

In this manner, the separation performance of the zeolite membrane 30 can be sufficiently enhanced by a configuration in which the total area of pinholes having an equivalent circle diameter greater than or equal to 1 μm is less than or equal to 0.02 $m^2$ per 1 $m^2$. More specifically, a configuration is possible in which the $CO_2/CH_4$ separation coefficient α is greater than or equal to 10.

When the membrane thickness of the zeolite membrane 30 is greater than 10 μm, the total surface area of pinholes having an equivalent circle diameter greater than or equal to 1 μm may be further reduced to further enhance the separation performance since bubbles during hydrosynthesis of the zeolite membrane 30 tend to detach from the seed crystals.

Method for Manufacturing Separation Membrane Structure

A method for manufacturing the separation membrane structure 10 will be described.

(1) Formation of Porous Substrate 20

Firstly, a green body for the substrate 20a is formed by molding a starting material for the substrate 20a into a desired shape by use of extrusion molding, a press molding method, a slip cast method, or the like.

Next, the green body for the substrate 20a is fired (for example, 900 degrees C. to 1450 degrees C.) to thereby form the substrate 20a. The substrate 20a according to the present embodiment includes a plurality of through holes to form a plurality of filtration cells CL.

Next, an intermediate layer slurry is prepared by use of a ceramic material having a desired particle diameter, and a green body for the intermediate layer 20b is formed by causing the intermediate layer slurry to downflow on an inner side of each through hole of the substrate 20a.

Next, the green body for the intermediate layer 20b is fired (for example, 900 degrees C. to 1450 degrees C.) to thereby form the intermediate layer 20b.

Next, a surface layer slurry is prepared by use of a ceramic material having a desired particle diameter, and a green body for the surface layer 20c is formed by causing downflow on an inner side of the green body for the intermediate layer 20b.

Next, the green body for the surface layer 20c is fired (for example, 900 degrees C. to 1450 degrees C.) to thereby form the surface layer 20c. In this manner, the porous substrate 20 is completed.

(2) Formation of Separation Membrane a. Attachment Step of Zeolite Seed Crystals Firstly, zeolite seed crystals are prepared. Zeolite seed crystals can be prepared using a known method in response to the desired zeolite seed crystal structure used to configure the zeolite membrane 30. For example, when the zeolite membrane 30 is configured by a DDR-type zeolite, a DDR-type zeolite seed crystal powder can prepared and used as a seed crystal according to the method for manufacturing a DDR-type zeolite based on the disclosure of M. J. den Exter, J. C. Jansen, H. van Bekkum, Studies in Surface Science and Catalysis, Vol. 84, Ed. By J. Weitkamp et al., Elsevier (1994), 1159-1166, or the disclosure of Japanese Patent Application Laid-Open No. 2004-083375.

Then, after dispersing the seed crystals in water, a seed crystal dispersion liquid is prepared by removal of coarse crystals. The seed crystal dispersion liquid is diluted by use of ion exchange water and the concentration of the zeolite seed crystals is adjusted to thereby prepare a seeded slurry solution.

Next the seeded slurry solution is coated onto an inner surface of the surface layer 20c to thereby attach the zeolite seed crystals to an inner surface of the surface layer 20c.

b. Synthetic Sol Preparation Step

Next, a synthetic sol containing a silica source, alumina source, alkali source and water is prepared. At that time, when the foamability of the synthetic sol is measured under a condition of 25 degrees C. by a Ross-Miles method, the foam height after elapse of 5 minutes from completion of down flow is less than or equal to 5 mm. The synthetic sol may include addition of an organic template as required.

The Ross-Miles method is a method prescribed by Chapter 6.5 of JIS K3362-1978, and this JIS standard regulates methods of testing the foaming of domestic synthetic detergents.

The method of measuring the foam height of the synthetic sol in the present embodiment is as follows. Firstly, the measurement environment is placed in a stable temperature of 25 degrees C. Then, 50 ml of synthetic sol is placed into a first cylinder, and 200 ml of synthetic sol is placed into a second cylinder disposed on the first cylinder. Next, 200 ml of synthetic sol is caused to flow down from the second cylinder to the first cylinder. At that time, foam is produced as a result of impact of the synthetic sol that flows down from the second cylinder into the synthetic sol in the first cylinder. Then, 5 minutes from completion of synthetic sol down flow from the second cylinder, the foam height (the height of foam visually estimated (mm), that is to say, the so-called degree of bubble stability) is measured with reference to the liquid surface of the synthetic sol in the first cylinder.

When the foam height measured by a Ross-Miles method is less than or equal to 5 mm, it is determined that the synthetic sol is adapted to the synthesis of the zeolite membrane 30 as described below. On the other hand, when the foam height measured by a Ross-Miles method is greater than 5 mm, after taking steps to suppress the foamability of the synthetic sol, it is necessary to reconfirm that the foam height measured by a Ross-Miles method is less than or equal to 5 mm.

The method of suppressing the foamability of the synthetic sol includes a method of adding a defoaming agent, a method of adding ethylene diamine to the synthetic sol, or a method of adjusting the added amount of the alkali source, or the like.

The defoaming agent includes use of at least one of a silicone defoaming agent, an ester defoaming agent, a polyether defoaming agent, and an alcohol defoaming agent. In particular the silicone defoaming agent is adapted as the defoaming agent due to low activity with respect to the synthetic sol and stability in a broad range of Ph environments. When adding the defoaming agent to the synthetic sol, the total content ratio of the defoaming agent to the synthetic sol is preferably greater than or equal to 1 ppm less than or equal to 10000 ppm. In this manner, a defoaming action is enabled without impeding the zeolite growth.

Ethylene diamine is a substance that is used to dissolve organic templates during the synthesis of a DDR membrane. The foamability of the synthetic sol can be suppressed by increasing the amount of ethylene diamine used to dissolve the organic template. However, when ethylene diamine is added in excess, the composition of the synthetic sol is changed, and zeolite synthesis by other than a desired crystalline structure may occur. Therefore when ethylene diamine is added to the synthetic sol, the content ratio of ethylene diamine to the synthetic sol is preferably less than or equal to 1 mol/L.

The alkali source is used as a counter cation in the zeolite. The alkali source includes use for example of NaOH, KOH, CsOH, or the like. The foamability of the synthetic sol may be inhibited by varying the added amount of the alkali source in response to the synthetic sol composition. However, varying the synthetic sol composition with reference to an addition concentration may result in zeolite synthesis by other than a desired crystalline structure, or a change in the $SiO_2/Al_2O_3$ ratio. As a result, when varying the addition amount of the alkali source, the addition amount must be varied with reference to the zeolite type.

The viscosity of the synthetic sol at 20 degrees C. is preferably greater than or equal to 1.0 mPa·s and less than or equal to 3.0 mPa·s. Vertical deviations and internal/external differences in the membrane thickness of the zeolite membrane 30 can be reduced since uniform supply of the synthetic sol is enabled when the viscosity of the synthetic sol is greater than or equal to 1.0 mPa·s. A vertical deviations in the membrane thickness is a membrane thickness difference in a longitudinal direction in one filtration cell CL. An internal/external difference in the membrane thickness is a membrane thickness difference in a filtration cell CL on an outer side in the radial direction and a filtration cell CL on an inner side in the radial direction of the porous substrate 20. Furthermore, defoaming can be realized by rapid displacement of the produced foam to the liquid surface by a configuration in which the viscosity of the synthetic sol is less than or equal to 3.0 mPa·s.

c. Immersion Step

Figure 3:
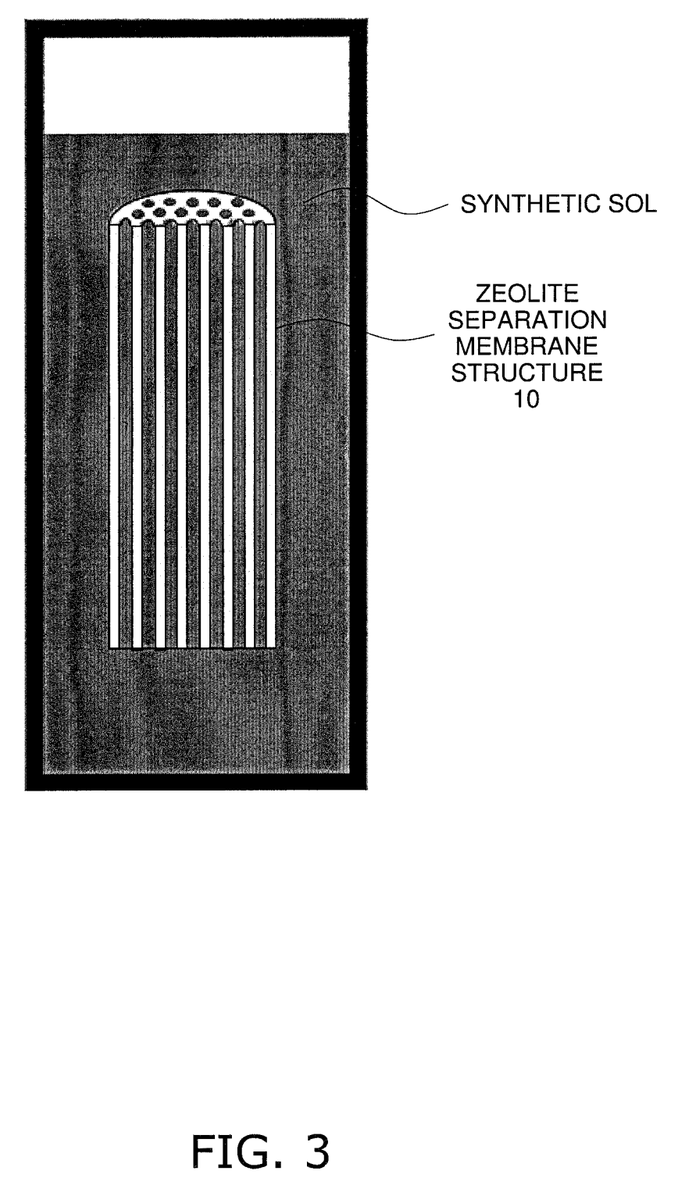
FIG. 3 is a schematic view describing an immersion step of a porous substrate in a synthetic sol.

Then, as shown in FIG. 3, the porous substrate 20 is immersed in the synthetic sol. At that time, as discussed above, the foam height of the synthetic sol as measured by a Ross-Miles method is suppressed to less than or equal to 5 mm. Consequently, it is possible to suppress attachment of the bubbles to the zeolite seed crystals that are attached to the surface of the porous substrate 20. Therefore, in the synthesis step described below, it is possible to inhibit the occurrence of membrane formation defects due to insufficient growth of seed crystals or pinholes.

The method of immersing the porous substrate 20 in the synthetic sol includes an immersion method in which the porous substrate is gradually immersion from above into a pressure vessel filled with the synthetic sol, or a dip method in which the synthetic sol is gradually filled from the bottom surface side of a pressure vessel in which the porous substrate 20 is disposed. The porous substrate 20 can be immersed in the synthetic sol in the same manner by either method.

In this regard, a 5% cumulative pore diameter (D5) in relation to a volume reference of the porous substrate 20 is greater than or equal to 0.1 μm. Under a condition in which the viscosity of the synthetic sol at 20 degrees C. is less than or equal to 3.0 Pa·s, it is preferred that the immersion rate prescribed by Equation (1) below is less than or equal to 500 cm³/s.

Immersion Rate (cm³/s)={total pore volume (cm³/g) in porous substrate×weight (g) of porous substrate 20}÷time required for immersion (s)     Equation (1)

Wherein: in Equation (1), the total pore volume of the porous substrate 20 is a value measured by mercury porosimetry. However, the total pore volume of the porous substrate 20 may be a theoretical value that is calculated by using a method of mercury porosimetry to measure the pore volume of a test piece of the porous substrate 20 and then calculating based on that measurement result.

In this manner, the immersion rate of the porous substrate 20 can be inhibited during the immersion step to thereby facilitate the penetration of the synthetic sol into the porous substrate 20. As a result, further inhibition of attachment of microscopic bubbles to the surface of the porous substrate 20 is enabled. Consequently, further inhibition of the occurrence of membrane formation defects or pinholes in the zeolite membrane 30 is enabled.

d. Impact Application Step

Next, it is preferred to further remove bubbles that have attached to the surface of the porous substrate 20 by application of an impact to the porous substrate 20 after immersion in the synthetic sol. In this manner, it is possible to further inhibit the occurrence of membrane formation defects or pinholes in the zeolite membrane 30.

The method of applying an impact to the porous substrate 20 includes a method of striking the pressure vessel or the porous substrate 20 with a bar or the like. However any method may be employed as long it is a method that applies a physical impact to the porous substrate 20.

e. Synthesis Step

Next, the pressure vessel is placed in a drying apparatus, and hydrothermal synthesis (heat processing) is performed for 1 to 240 hours at 100 to 200 degrees C. to thereby form the zeolite membrane 30.

At that time, as described above, it is possible to inhibit membrane formation defects resulting from insufficient seed crystal growth or pinholes caused by attachment of microscopic bubbles to the surface (more specifically, the inner surface of the surface layer 20c) of the porous substrate 20.

Next, the porous substrate 20 with the formed zeolite membrane 30 is washed and dried at 80 to 100 degrees C.

Then, when an organic template is included in the synthetic sol, the porous substrate 20 is placed in an electric furnace, and heated in air for 1 to 200 hours at 400 to 800 degrees C. to thereby fire and remove the organic template.

Other Embodiments

Although an embodiment of the present invention has been described, the present invention is not limited to the above embodiment, and various modifications are possible within a scope that does not depart from the spirit of the invention.

In the present embodiment, the porous substrate 20 has a monolithic configuration. However there is no limitation in that regard. The porous substrate 20 for example may be configured with a cylindrical, flat plate or tubular shape (circular tube). When the porous substrate is formed in a tubular shape, the zeolite membrane 30 may be formed on an inner surface of the porous substrate 20, or may be formed on an outer surface of the porous substrate 20.

Although there was no disclosure in the above embodiment, both ends of the porous substrate 20 may be sealed by a seal portion. However the seal portion is provided so that the opening at both ends of the cells CL is not covered.

In the above embodiment, the porous substrate 20 includes a substrate 20a, an intermediate layer 20b and a surface layer 20c. However, at least one of the intermediate layer 20b and the surface layer 20c may be omitted.

EXAMPLES

Examples 1 to 20

1. Preparation of Porous Substrate

Firstly 30 vol % of an inorganic binding material was added to 70 vol % of alumina particles (aggregate) having an average particle diameter of 12 μm. Then a molding auxiliary agent such as an organic binder or the like and a pore forming agent were added and dry mixed. Then water and a surface active agent were added, and mixed and kneaded to prepare a clay. The inorganic binding material includes use of talc, kaolin, feldspar, clay or the like having an average particle diameter of 1 to 5 μm to form a mixture of $SiO_2$ (70 mass %), $Al_2O_3$ (16 mass %), and alkali earth metals and alkali metals (11 mass %).

Next, the clay was extrusion molded to thereby prepare a green body for a monolithic porous substrate. Then, the green body for the porous substrate was fired (1250 degrees C., one hour) to thereby obtain an alumina substrate having a plurality of cells.

Next, PVA (organic binder) was added to the alumina powder to prepare a slurry and thereby form a green body for the intermediate layer on an inner surface of the cells of the alumina substrate by a filtration method using the slurry. Then the green body for the intermediate layer was fired (1250 degrees C., 1 hour) to form the intermediate layer.

Next, both end surfaces of the alumina substrate were sealed with glass. In this manner, a monolithic porous substrate was completed.

2. Preparation of Zeolite Membrane

Next, a DDR-type zeolite crystal powder was prepared based on the method for manufacturing a DDR-type zeolite as disclosed in Japanese Patent Application Laid-Open No. 2004-083375, and that powder was configured as a zeolite seed crystal.

Then, after dispersing the seed crystals in water, a seed crystal dispersion liquid was prepared by removal of coarse crystals. The seed crystal dispersion liquid was diluted by use of ion exchange water and the concentration of the zeolite seed crystals was adjusted to be 0.001 to 0.36 mass % to thereby prepare a seeded slurry solution.

Then the seed crystal dispersion liquid was diluted by use of ion exchange water and the concentration of the zeolite seed crystals was adjusted to be 0.001 to 0.36 mass % to thereby prepare a seeded slurry solution. The seeded slurry solution was caused to flow into cells thereby attach the seed crystals to an inner surface of the surface layer.

Then, 1.156 g of 1-adamantane amine (manufactured by Aldrich) was added to 10 g of ethylene diamine or ethanol, and dissolved. Next 120.0 g of 30 mass % colloidal silica (Trade name: Snowtex S, manufactured by Nissan Chemical Industries, Ltd.), 30 g of ion exchange water and 1 g of 10 mass % NaOH aqueous solution were added to the mixed liquid in which the 1-adamantane amine was dissolved, stirred for 60 minutes, and diluted 1 to 10 times with water to thereby prepare a synthetic sol.

Next, as shown in Table 1, the synthetic sol is adjusted so that the foam height measured by a Ross-Miles method was less than or equal to 5 mm. More specifically, in Examples 6 to 10, a silicone defoaming agent, and in Example 11 an alcohol defoaming agent were added to suppress the foam height of the synthetic sol. Furthermore, in Examples 1 to 5 and 9 to 20, the added amount of ethylene diamine or NaOH was adjusted to thereby suppress the foam height of the synthetic sol.

Next, the porous substrate was gradually immersed in the synthetic sol that had been filled into a pressure vessel. At that time, the immersion rate described by Equation (1) above was varied in each Example as shown in Table 1.

Next, a DDR-type zeolite membrane was formed by hydrothermal synthesis for 10 to 50 hours at 150 degrees C.

Example 21

In substitution for a monolithic porous substrate, a separation membrane structure was prepared in the same manner as that described in Example 1 except that a tubular shaped porous substrate was used. In Example 21, a DDR membrane that is the same as Example 1 was formed on an inner surface of the tubular shaped porous substrate.

Example 22

A separation membrane structure was prepared in the same manner as that described in Example 1 except that in substitution for a monolithic porous substrate, a tubular shaped porous substrate was used, and in substitution for use of a DDR membrane, a CHA membrane was formed according to the method of preparation described in Comparative Example 2 of Japanese Patent Application Laid-Open No. 2014-198308. In Example 22, the CHA membrane was formed on an inner surface of the tubular shaped porous substrate.

Example 23

A separation membrane structure was prepared in the same manner as that described in Example 1 to Example 20 except that an AEI zeolite membrane was formed according to the method of preparation described in PCT Laid Open Application 2014/157324. In Example 23, the foam height was suppressed by addition of a silicone defoaming agent so that the foam height of a synthetic sol measured by a Ross-Miles method is less than or equal to 5 mm.

Example 24

A separation membrane structure was prepared in the same manner as that described in Example 1 to Example 20 except that an MFI zeolite membrane was formed according to the method of preparation described in the specification of Japanese Patent No. 5481075. In Example 24, the foam height was suppressed by addition of a silicone defoaming agent so that of the foam height of a synthetic sol measured by a Ross-Miles method is less than or equal to 5 mm.

Comparative Examples 1 to 6

The zeolite membrane structure according to Comparative Examples 1 to 6 was prepared using the same steps as those described in Example 1 to Example 22 except that the foam height of a synthetic sol was not adjusted to be less than or equal to 5 mm.

Method of Calculation of Pinhole Surface Area per 1 $m^2$

In relation to the respective Examples (excluding Examples 21 and 22) and the respective Comparative Examples, pinholes having a circle equivalent diameter of greater than or equal to 1 μm were examined by observation of the zeolite membrane surface using an SEM (magnification 10000 times, and field of view 0.01 $mm^2$).

Then the total surface area of the detected pinholes in the field of view of 0.01 $mm^2$ was calculated as a total pinhole area per 1 $m^2$.

Examination of Pinhole Number

In the Examples and Comparative Examples, an aqueous solution containing 0.3 mass % of Rhodamine B was poured into the cells, and an optical microscope was used for visual confirmation of whether or not coloring was observed.

Then, the number of pinholes per 1 $cm^2$ was counted by SEM observation of the colored cells.

Examination of Defective Cells

In the Examples and Comparative Examples, the presence or absence of defective cells was determined with reference to a vacuum measurement method as described in the specification of PCT Laid Open Application 2014/050702. More specifically, a vacuum gauge (calibrator manufactured by GE Sensing, Model No. DPI800) was mounted on one end of each cell, a vacuum pump (AS ONE model number G-20DA, exhaust speed 24 L/min, ultimate pressure 1.3× 10-1 Pa, 2-stage type) was used to create a vacuum, and the ultimate vacuum was measured in each cell. Then, an average value and a standard deviation ($\sigma$) for the vacuum of all cells was calculated to thereby determine defective cells as those cells having a vacuum that is lower than (average value+2$\sigma$).

Then the presence or absence of seed crystal growth defects was determined by SEM observation of a cross section of a cell that has been determined to be defective. Table 1 shows the proportion of cells having a seed crystal growth defect relative to the total number of cells.

Measurement of $CO_2/CH_4$ Separation Performance

Each Example (however excluding Example 24) and each Comparative Example (however excluding Comparative Example 6) were supplied with a mixed gas ($CO_2:CH_4=50$ vol %: 50 vol %, partial pressure of each gas: 0.3 MPa) of $CO_2$ (carbon dioxide) and $CH_4$ (methane) into each cell to thereby analyze the gas that passes through the separation membrane structure and measure the $CO_2/CH_4$ separation coefficient $\alpha$.

The separation coefficient $\alpha$ is calculated with reference to ($CO_2$ concentration on permeation side/$CH_4$ concentration on permeation side)/($CO_2$ concentration on supply side/$CH_4$ concentration on supply side) based on the supply side and permeation side gas concentration about the zeolite membrane.

TABLE 1

| | Separation Membrane | | Support | Synthetic Sol | | | Addition Amount of Defoaming Agent (ppm) |
|---|---|---|---|---|---|---|---|
| | Type | Subtype | Shape | Foam Height (mm) | Viscosity (mPa·s) | Defoaming Agent | |
| Example 1 | Zeolite | DDR | Monolithic | 0 | 1 | None | — |
| Example 2 | Zeolite | DDR | Monolithic | 0 | 1.4 | None | — |
| Example 3 | Zeolite | DDR | Monolithic | 0 | 3 | None | — |
| Example 4 | Zeolite | DDR | Monolithic | 2 | 1 | None | — |
| Example 5 | Zeolite | DDR | Monolithic | 5 | 1 | None | — |
| Example 6 | Zeolite | DDR | Monolithic | 0 | 1 | Silicone | 100 |
| Example 7 | Zeolite | DDR | Monolithic | 0 | 1.4 | Silicone | 200 |
| Example 8 | Zeolite | DDR | Monolithic | 0 | 3 | Silicone | 200 |
| Example 9 | Zeolite | DDR | Monolithic | 0 | 1 | Silicone | 1000 |
| Example 10 | Zeolite | DDR | Monolithic | 0 | 1 | Silicone | 10000 |
| Example 11 | Zeolite | DDR | Monolithic | 0 | 1 | Alcohol | 200 |
| Example 12 | Zeolite | DDR | Monolithic | 0 | 1 | None | — |
| Example 13 | Zeolite | DDR | Monolithic | 0 | 1 | None | — |
| Example 14 | Zeolite | DDR | Monolithic | 0 | 1 | None | — |
| Example 15 | Zeolite | DDR | Monolithic | 0 | 1 | None | — |
| Example 16 | Zeolite | DDR | Monolithic | 0 | 1 | None | — |
| Example 17 | Zeolite | DDR | Monolithic | 0 | 1 | None | — |
| Example 18 | Zeolite | DDR | Monolithic | 0 | 1 | None | — |
| Example 19 | Zeolite | DDR | Monolithic | 0 | 1 | None | — |
| Example 20 | Zeolite | DDR | Monolithic | 0 | 1 | None | — |
| Example 21 | Zeolite | DDR | Tubular | 0 | 1 | None | — |
| Example 22 | Zeolite | CHA | Tubular | 0 | 1 | None | — |
| Example 23 | Zeolite | AEI | Monolithic | 0 | 1 | Silicone | 200 |
| Example 24 | Zeolite | MFI | Monolithic | 0 | 1 | Silicone | 200 |
| Comparative Example 1 | Zeolite | DDR | Monolithic | 10 | 1 | None | — |
| Comparative Example 2 | Zeolite | DDR | Monolithic | 10 | 3.5 | None | — |
| Comparative Example 3 | Zeolite | DDR | Monolithic | 10 | 1 | None | — |
| Comparative Example 4 | Zeolite | DDR | Monolithic | 10 | 3.5 | None | — |
| Comparative Example 5 | Zeolite | AEI | Monolithic | 6 | 1 | None | — |
| Comparative Example 6 | Zeolite | MFI | Monolithic | 7 | 1 | None | — |

| | Immersion Rate (cm³/s) | Pinhole Number per 1 cm² (number/cm²) | Defective Cell Occurrence Probability Defective Number/Total Cell Number (%) | Zeolite Membrane Thickness μm | Pinhole Surface Area per 1 m² m² | $CO_2/CH_4$ Separation Coefficient α | Evaluation |
|---|---|---|---|---|---|---|---|
| Example 1 | 19.2 | 0.03 | 0.1 | 5 | 0.0006 | 107 | ○ |
| Example 2 | 19.2 | 0.03 | 0.8 | 5 | 0.0083 | 30 | ○ |
| Example 3 | 19.2 | 0.05 | 0.9 | 5 | 0.0089 | 20 | △ |
| Example 4 | 19.2 | 0.15 | 0.4 | 5 | 0.0044 | 89 | ○ |
| Example 5 | 19.2 | 0.23 | 0.6 | 5 | 0.0056 | 43 | △ |
| Example 6 | 19.2 | 0.00 | 0.0 | 5 | 0.0000 | 200 | ○ |
| Example 7 | 19.2 | 0.01 | 0.0 | 5 | 0.0000 | 250 | ○ |
| Example 8 | 19.2 | 0.02 | 0.0 | 5 | 0.0000 | 222 | ○ |
| Example 9 | 19.2 | 0.00 | 0.0 | 5 | 0.0000 | 180 | ○ |
| Example 10 | 19.2 | 0.00 | 0.0 | 5 | 0.0000 | 188 | ○ |
| Example 11 | 19.2 | 0.02 | 0.0 | 5 | 0.0000 | 190 | ○ |
| Example 12 | 167 | 0.13 | 0.5 | 5 | 0.0050 | 70 | ○ |
| Example 13 | 500 | 0.25 | 0.8 | 5 | 0.0083 | 31 | △ |
| Example 14 | 625 | 0.41 | 0.9 | 5 | 0.0089 | 20 | △ |
| Example 15 | 714 | 0.44 | 1.0 | 5 | 0.0100 | 21 | △ |
| Example 16 | 833 | 0.44 | 1.9 | 5 | 0.0195 | 10 | △ |
| Example 17 | 1.0 | 0.03 | 0.1 | 5 | 0.0006 | 122 | ○ |
| Example 18 | 0.0011 | 0.02 | 0.0 | 5 | 0.0000 | 220 | ○ |
| Example 19 | 2 | 0.03 | 0.0 | 5 | 0.0000 | 220 | ○ |
| Example 20 | 10 | 0.04 | 0.0 | 5 | 0.0000 | 201 | ○ |
| Example 21 | 19 | 0.02 | — | 2 | 0.0000 | 200 | ○ |
| Example 22 | 19 | 0.02 | — | 9 | 0.0000 | 150 | ○ |
| Example 23 | 4.6 | 0.02 | 0.1 | 5 | 0.0006 | 30 | ○ |
| Example 24 | 4.6 | 0.02 | 0.0 | 10 | 0.0000 | — | ○ |

TABLE 1-continued

| | | | | | | | |
|---|---|---|---|---|---|---|---|
| Comparative Example 1 | 19.2 | 0.64 | 5.6 | 5 | 0.0556 | 2.1 | x |
| Comparative Example 2 | 19.2 | 0.49 | 11.1 | 5 | 0.1112 | 1.2 | x |
| Comparative Example 3 | 1000 | 0.51 | 2.2 | 5 | 0.0222 | 8.4 | x |
| Comparative Example 4 | 1000 | 0.75 | 13.9 | 5 | 0.0250 | 1.1 | x |
| Comparative Example 5 | 1000 | 0.83 | 2.5 | 5 | 0.1390 | 2.5 | x |
| Comparative Example 6 | 1000 | 0.98 | 3.7 | 10 | 0.0367 | — | x |

As shown in Table 1, in Examples 1 to 24 in which the foam height of the synthetic sol as measured by a Ross-Miles method was adjusted to be less than or equal to 5 mm, the occurrence of a defect resulting from insufficient seed crystal growth or the production of a pinhole could be inhibited. This feature is due to the fact that attachment of microscopic bubbles to the surface of the porous substrate could be inhibited.

As shown by a comparison of Example 13 and Comparative Examples 14 to 16, it has been demonstrated that the occurrence of pinholes can be further inhibited by a configuration in which the immersion rate during immersion of the porous substrate in the synthetic sol is less than or equal to 500 cm³/s. This feature is due to the fact that attachment of microscopic bubbles to the surface of the porous substrate is even more inhibited since the synthetic sol easily penetrates the porous substrate.

As shown by a comparison of Examples 1, 2 and 3, there is further inhibition of growth defects resulting from insufficient growth in the seed crystals in a configuration in which the viscosity of the synthetic sol at 20 degrees C. is less than or equal to 1.4 mPa·s.

As shown by a comparison of Examples 1, 4 and 5, there is further inhibition of the occurrence of pinholes in a configuration in which the foam height of the synthetic sol is less than or equal to 2 mm.

As shown in Table 1, the $CO_2/CH_4$ separation coefficient α of Examples 1 to 24 was greater than or equal to 10. This feature is due to the fact that a zeolite membrane was formed in which the membrane thickness was less than or equal to 10 μm and the total pinhole surface area having an equivalent circle diameter of greater than or equal to 1 μm per 1 m² was less than or equal to 0.02 m². As described above, the formation of this type of zeolite membrane was enabled by use of a synthetic sol in which the foam height was inhibited to less than or equal to 5 mm.

The invention claimed is:

1. A method for manufacturing a zeolite membrane structure comprising:

immersing a porous substrate in a synthetic sol; and hydrothermally synthesizing a zeolite membrane on a surface of the porous substrate that has been immersed in the synthetic sol; and wherein when a foamability of the synthetic sol is measured by a Ross-Miles method under a condition of 25 degrees C., a foam height after elapse of 5 minutes from completion of down flow is less than or equal to 5 mm, and when a 5% cumulative pore diameter (D5) in relation to a volume reference of the porous substrate is greater than or equal to 0.1 μm and a viscosity of the synthetic sol at 20 degrees C. is less than or equal to 3.0 Pa·s, an immersion rate prescribed by Equation (1) below is less than or equal to 500 cm³/s:

Immersion Rate (cm³/s)={total pore volume (cm³/g) of porous substrate×weight (g) of porous substrate}÷time required for immersion (s).  Equation (1)

2. The method for manufacturing a zeolite membrane structure according to claim 1, wherein a viscosity of the synthetic sol at 20 degrees C. is greater than or equal to 1.0 mPa·s to less than or equal to 3.0 mPa·s.

3. The method for manufacturing a zeolite membrane structure according to claim 1, wherein the synthetic sol contains at least one of a silicone defoaming agent, an ester defoaming agent, a polyether defoaming agent, and an alcohol defoaming agent, and a content ratio of the at least one defoaming agent in the synthetic sol is greater than or equal to 1 ppm less than or equal to 10000 ppm.

4. The method for manufacturing a zeolite membrane structure according to claim 1, wherein applying an impact to the porous substrate between the immersion step and the synthesis step.

* * * * *